A. BLONDEL.
METHOD AND APPARATUS FOR DETERMINING THE DIRECTION OF A HERTZIAN LIGHTHOUSE.
APPLICATION FILED NOV. 4, 1913.
1,218,237.
Patented Mar. 6, 1917.
2 SHEETS—SHEET 1.
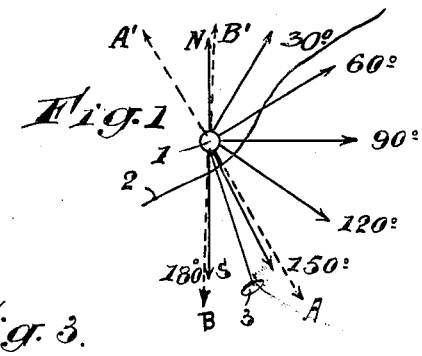
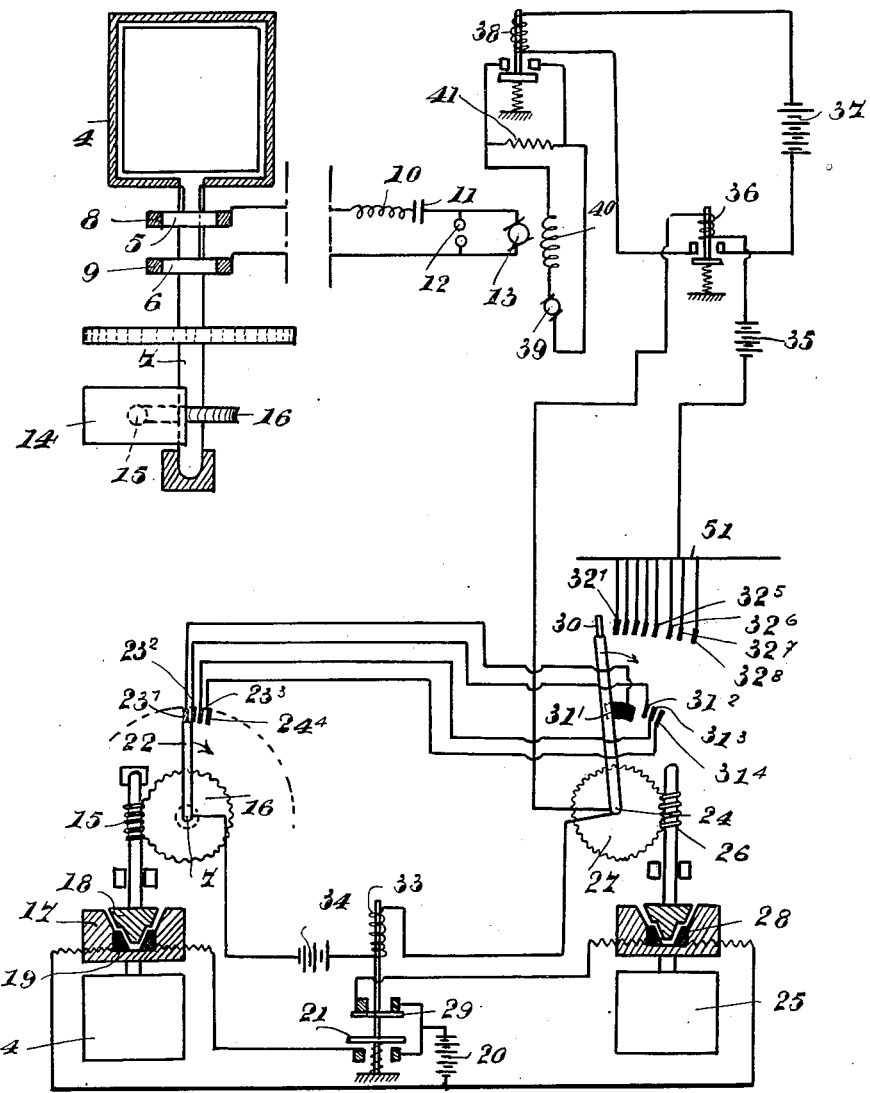
WITNESSES
F. H. Logan
Cornelius Roving
INVENTOR
ANDRÉ BLONDEL
BY H. Van Dedemuel
ATTORNEY

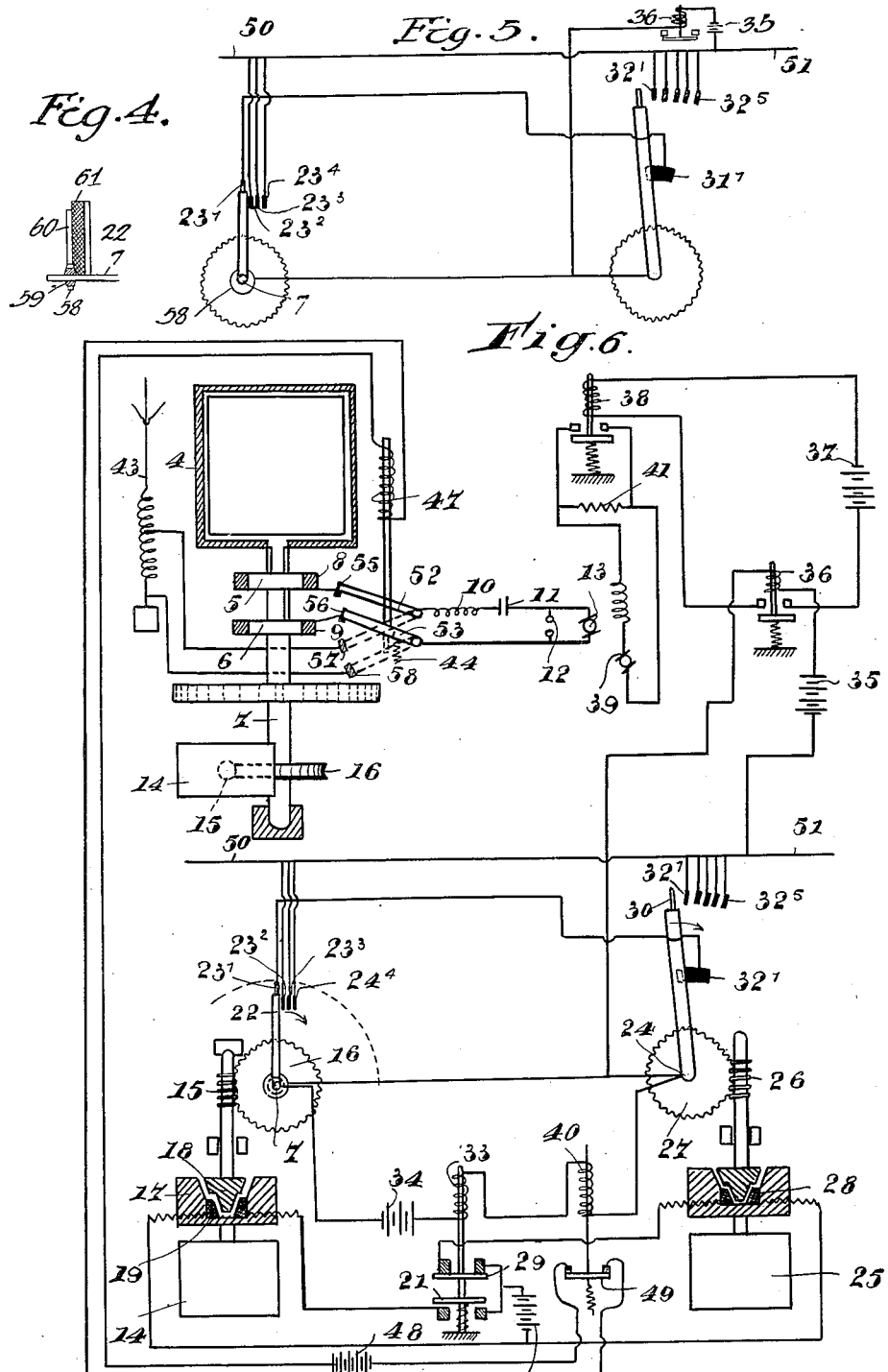

UNITED STATES PATENT OFFICE.

ANDRÉ BLONDEL, OF PARIS, FRANCE.

METHOD AND APPARATUS FOR DETERMINING THE DIRECTION OF A HERTZIAN LIGHT-HOUSE.

1,218,237.    Specification of Letters Patent.    Patented Mar. 6, 1917.

Application filed November 4, 1913. Serial No. 799,153.

*To all whom it may concern:*

Be it known that I, ANDRÉ BLONDEL, a citizen of the French Republic, residing at Paris, France, have invented a new and useful Method and Apparatus for Determining the Direction of a Hertzian Lighthouse; and I do hereby declare the following to be a full, clear, and exact description of the same.

It is of great importance in certain cases, namely for a ship which is approaching land in foggy weather, to be able to determine the position of a Hertzian lighthouse from which signals are being received, that is to say, the direction in which the said lighthouse is situated.

There are already methods and apparatus utilizing directed Hertzian waves so as to enable a receiving station to locate the transmitting station. One of them consists in rotating at a uniform speed the plane of emission so as to insure its passing at a given moment through the receiving station, and in providing the receiving station with a watch graduated like the windrose, the speed of rotation of which is exactly the same as that of the plane of emission. An ordinary signal sent out by the transmitting station which can be perceived on the whole horizon, makes known to the receiving station the moment at which the plane of the waves begins its rotation starting from the north. The observer starts his watch, so that at each moment the hand indicates the position of the plane of emission. The observer stops the watch when the plane of emission passes through the receiving station, that is to say, when the sound is a maximum at the receiving telephone. The watch indicates then the position of the Hertzian lighthouse.

In reality, the waves sent out, are not limited to the plane of emission, they are contained in a certain sector divided by the said plane. They can even be perceived on the whole horizon. It is however possible to recognize at the telephone the maximum or the minimum of sound, which corresponds to the moment when the plane of emission or the perpendicular plane, pass through the receiving station.

This system has numerous drawbacks. It requires an absolute regularity and synchronism or rotation of the plane of emission and of that of the watch. There is necessarily a delay between the sending out of the first signal and the starting of the watch. The appreciation of the moment when the sound is maximum or minimum, is not accurate.

This invention relates to a method and apparatus which do away with the above drawbacks.

The method is based on the following principle: a Hertzian lighthouse is caused to send out "directed" waves, successively in different directions, as close to each other as desired and uniformly distributed on the whole horizon. In each of these directions are sent out signals characterizing the said direction. In that way, a ship which is within reach of the lighthouse, will be necessarily struck by at least one wave signal when the plane of emission is turned in her direction, provided that the successive waves are sent out in planes fairly close to each other. This signal will tell her, both the presence of the lighthouse and the position of the same. The lighthouse will signal its characteristic, that is to say, a signal corresponding to its name, at least one time for each turn of the horizon.

It is possible to design for each of the well known methods of production of directed waves, automatic apparatus which will make the application of this method possible. The present applicant has already described in 1910 (*Bulletin of the Society of Electricians* of the 5th of January, 1910, page 37) an apparatus for producing in different azimuths directed waves which consisted of a large number of frames open at their lower portion and arranged about one and the same vertical axis at regular angular intervals. The two ends of each frame terminated at two opposite keys arranged on a fixed ring, in the interior of which was provided a rotating switch with two contact levers connected to the apparatus producing Hertzian oscillations. By turning the switch, it is possible to turn in space the plane of the directed waves sent out by the apparatus. The apparatus in question has the drawback that it limits the number of planes of emission and requires a high pressure switch which is always a delicate matter.

The so-called "radiogoniometer" system is also known which consists of two fixed frames of mast wires, at a right angle, (or more generally, of several frames forming equal angles) in the interior of which acts by induction a movable coil through which passes an oscillating current. The rotation of the coil produces the rotation of the plane of emission of directed waves.

This invention relates, in addition to the new method of signaling, to a device which enables the said method to be applied either to the system with fixed frames with a rotating switch, without high pressure sparks, or to the radiogoniometer system.

This device comprises two continuously rotating motors which can drive, by means of two clutches, only one of which is in engagement at a time: the former, the rotating switch or the coil of the radiogoniometer, and the second a commutator or switch with studs intended to produce the desired signals by operating the sending key, while the plane of emission remains fixed in each of its positions.

Figure 1 illustrates the principle of the method,

Fig. 2 shows in plan the diagram of application of the said method to a transmitting station with radiogoniometer, Fig. 3 which is a portion of the diagram of Fig. 2, is the repetition in elevation of the parts of the said figure shown immediately below. It is merely intended to explain more clearly the connections of the diagram, Fig. 4 which is a part of the scheme of Fig. 5 shows a detail of construction of the commutator 22.

Fig. 5 shows a connection in which the rotating switch itself produces the intermediate signals.

Fig. 6 shows a device enabling an ordinary mast wire to be used for sending out intermediate signals.

The principle of the method is as follows (Fig. 1):

The Hertzian lighthouse 1 situated for instance near the shore 2, will send out a series of signals by means of directed waves distributed in the following manner:

In the northern direction N, the signal O (zero) in accordance with the Morse alphabet, that is to say (— — — — —); then by rotating in the direction of the hands of a watch, every three degrees, it will send out a signal $e$ constituted by (.). On arriving in the direction of N 30°E, it will send out the signal 1, then it will recommence every 3° the signal $e$. In passing through the position N 60°E, N 90°E=East, N 120°E, N 150°E and N 180°E=South, it will respectively send out the Morse alphabet signals corresponding to the numbers 2, 3, 4, 5 and 6 in the intervals, as just explained, every 3° the signal $e$. After having passed through the direction south at 180°, the lighthouse will still send out every three degrees the signal $e$ and every 30° a letter H, for instance, which will be the characteristic allotted to the said lighthouse, that is to say, which will make it possible to find out which is the lighthouse from which the signals are being received. It goes without saying that the directed signals can be perceived simultaneously in the two directions of the plane of sending out, comprised on both sides of the lighthouse, and even in a certain sector at either side of the said plane.

Assuming that a ship 3 provided with an ordinary wireless telegraphy receiving apparatus, is within the range of action of the lighthouse 1, and is steering any desired course, she will theoretically receive a signal from the lighthouse when the plane of emission coincides with the direction 1—3. In practice, she will receive all the signals that may be sent out within a certain angle, always greater than 30° and generally near 45°, equally distributed at either side of the direction 1—3. This reception sector will be limited, for instance by the two directions A. B. The angle of 30° has been selected as being that which separates two geographic indications of azimuth of the waves sent out, or two emissions of the characteristic of the lighthouse, and is, as just explained, smaller than the reception sector of the ship 3. It follows that within the said sector, during one turn of the horizon, the ship will necessarily receive at least once a geographic indication of azimuth, and at least once the characteristic of the lighthouse during the opposite half-turn of the horizon. By counting the number of signals $e$ received before and after each of the said indications, the ship will be able to determine the geographic azimuth of the two planes A—B which limit its reception sector. By taking the line dividing the said angle, she will locate the position of the Hertzian lighthouse 1.

This is for instance the sequence of signals that the ship will receive:

2 times $e$—N°. 5
9 " " N°. 6
4 " "

They will be interpreted in the following manner:

$2\times3°=6°$—N 150°E—$9\times3°$—N 180°E—$4\times3°=12°$ that is to say, that the first signal received indicating the limit A, of the reception sector, will be in the direction N 150 E—6°=N 144°E. The last signal received indicating the limit B, will be N 180 E+12°=N 192°E=South+12°=S. 12.0. The central line dividing this sector, that is to say, the position of the lighthouse, will be $$\frac{192+144}{2} = N\ 168\ E = S.\ 12.E.$$

A moment afterward, the ship 3 will receive the directed waves sent out in the sector A¹ B¹, among which there will be a certain number of letters $e$, and twice the letter H which is the characteristic of the lighthouse, so that the ship will be able to recognize it. If at the same time she could receive signals of the same kind from a second lighthouse, she would locate in the same way its position, and thus will have her exact position owing to the intersection of the two directions.

The location of the position can be made during a single turn of the horizon of the transmitting station, which could last for instance one minute. A precision of at least 3° will be obtained in the foregoing example. In order easily to interpret the signals received and heard at the telephone, they could be marked on a circular diagram prepared beforehand, similar to that shown in Fig. 1.

Under the action of diffraction of the waves, and more particularly when the aerial frames are not strictly adjusted, in accordance with the theoretical shape of the two mast wires, to the ¼ of the wave, showing between them a difference of phase of half the length of a wave, the directed waves cannot give a very sharp maximum in their principal plane, or produce a complete disappearance of sound in the telephone. In such a case it is preferable to reduce the coupling at the receiving station in order to weaken the sound and to obtain extinction azimuths. But it is also possible to determine the position of the minimum of sounds by ascertaining which is the azimuth for which the signals received, seem to be the weakest. The position of the maximum which could not be determined direct, will be obtained by adding or subtracting an angle of 90° to or from that which gives the minimum.

It is moreover advisable to remember that there are two types of aerial "directing" systems: one in which opposite currents circulate simultaneously in the two vertical mast wires, and the other in which currents of the same direction pass simultaneously through the two mast wires. In the former case, the plane of maximum intensity of the waves is the joint plane of the two mast wires, while in the second case it is the perpendicular plane.

It goes without saying that the signal conventions hereinbefore given, by way of example, may be modified without departing from the principle of the method which is to signal each of the azimuths of emission.

Fig. 2 shows a construction of a transmitting apparatus by means of which it is possible to send out automatically directed waves, as explained, by means, for instance, of a radiogoniometric coil rotating in a system of two mast wire frames situated in planes at a right angle to each other. The movable coil is constituted by a frame 4 on which is wound a wire, the ends of which terminate at rings 5, 6 mounted on the spindle of rotation 7 and rotating in contact with, and in the interior of, fixed rings 8, 9. This part of the apparatus is shown in elevation in Fig. 3 for the sake of greater clearness, but it forms a portion of the diagram of Fig. 2 of which it is merely a detail, the spindle 7 being shown in plan at the bottom of the figure. The two fixed rings 8, 9 are connected to the two ends of an ordinary oscillating circuit comprising a self-induction 10, a capacity 11, a spark gap 12 and an alternator 13 grouped in accordance with any of the usual methods. The spindle 7 carrying the movable frame 4, is driven by continuously rotating electric motor 14 by means of a worm 15 engaging with a toothed wheel 16 carried by the said spindle 7. The worm 15 is itself driven by the motor 14 by means of an electromagnetic clutch constituted by two magnetic masses 17, 18 one connected to the spindle of the motor and the other to the worm 15, the said masses being held together, if desired, by the excitation of a winding 19. The said winding is fed from an electric source 20. On the circuit of the said source 20 is arranged a switch 21. The rotary spindle 7 is provided with an arm 22 which can come into contact with a series of studs 23 arranged every 3°. A second rotating spindle 24 is driven by a continuously rotating motor 25 by means of a worm 26 and of a toothed wheel 27. The motor 25, like the motor 14, is provided with an electromagnetic clutch 28 fed from the same source 20 as the clutch 19. The feed circuit comprising switch 29 secured to the switch 21, is arranged in such a manner that a single one of the two feed circuits for the clutch windings 19, 28 should be operative at a time. The spindle 24 is provided with an arm 30 which can come into contact with two series of studs 31, 32. The studs 31 are intended to send the current into one of the clutches 19 or 28, either in order to rotate the spindle 7 and bring the frame 4 successively into the different positions from 3° to 3° in which the different signals are to be sent out, or for rotating the spindle 24 and sending out at each azimuth in which the frame stops the desired signals by means of the studs 32 acting, by means of a relay, on the excitation of the alternator 13 of the oscillating circuit, that is to say, on the signaling key 38. The two circuits which enable these results to be obtained, are as follows:

For controlling the double switch 21—29, an electromagnet 33 is arranged on a circuit fed by a battery 34 and passing through the spindle 7, arm 22, studs 23, studs 31, arm 30, spindle 24, electromagnet 33 and returning to the battery 34. The circuit which brings about the sending out of signals is fed by a battery 35. It passes through the studs 32, arm 30, spindle 24, relay 36 and returns to the battery 35.

The said relay 36 in its turn acts on a circuit fed by a battery 37 and manipulating the shunt switch 38 of the excitation circuit of the alternator 13, that is to say, the signaling key. This exciting circuit of the alternator 13 is constituted by the source 39, inductor winding 40 and shunt resistance 41 which can be switched in or not, according as the key 38 is open or closed.

The working of this device for characteristic directed emission, is as follows:

When the arm 22 of the spindle 7 is in contact with the first stud 23' of the series 23, the radiogoniometric coil 4 is in the desired position in order that the signals should be sent out in the northern direction. At that moment, the arm 30 is in contact with the first stud 31' of the series 31. The exciting circuit of the electromagnet 33 is closed, the switch 29 is closed and the current from the source 20 is sent into the electromagnetic clutch 28. The motor 25 which is continuously rotating, drives the spindle 24 and brings the arm 30 successively into contact with the first series 32'—$32^5$ of the studs 32. This first series is constituted by a group of 5, each having a certain width. They correspond to the sending out of 5 long signals forming in the Morse alphabet 5 dashes, that is to say, the number 0 (zero) which is the geographic signal of waves sent out north. During all this time, the arm 30 remains in contact with the first stud $31^1$ of the series 31. Then it leaves it and opens the circuit of the battery 34, so that the electromagnet 33 being no longer operated, the switch 29 opens and the switch 21 closes. The spindle 24 stops, while the spindle 7 is driven by the throwing in of the electromagnetic clutch 19 which secures the worm 15 to the motor 14 which is continuously rotating. The arm 22 arrives at the second stud 23 of the series 23, which corresponds to a movement of the frame 4 to the extent of 3°. As soon as it is in contact with this second stud, the circuit of the battery 34 is again closed, as the arm 30, driven by its movement, has come into contact, before stopping, with the second stud $31^2$ of the series 31. It is also in contact with the next stud $32^6$ of the series 32 which corresponds to the sending out of a short signal, that is to say of the sign $e$ represented by a dot in the Morse alphabet. The working continues in the same way during the whole turn of the horizon. The frame stops each time at the desired azimuth, then the emission of the signals provided for the said azimuth takes place.

The speed of rotation of the apparatus can be increased by modifying it in such a manner that the spindle of the main switch 7 stops its rotation only for sending out principal signals which, in the foregoing example, are sent out every 30° and which, in the Morse alphabet, require a somewhat long group of operating studs 32. As regards the intermediate signals represented here by letters $e$, that is to say, by a single quick dot, it is sufficient to obtain them direct by means of the switch 22 itself for this purpose the arm 22 does not, as in Fig. 2, consist of an integral metallic rod, but on the contrary consists of 2 metallic rods, electrically insulated from each other by an insulator 61. A first rod 22 is electrically connected with the shaft 7 and a second rod 60 is electrically connected with a sleeve 58 insulated from the shaft 7 by the insulator 59.

The small studs $32^5$—$32^6$—$32^7$, etc., and $31^2$—$31^3$—$31^4$ of Fig. 2, which were intended to produce the signals ($e$) are done away with. The connection 51 which unites the studs of the 32 series, is prolonged so as to unite also the studs $23^2$—$23^3$—$23^4$. These studs are mounted so as to come into contact with the rod 60, whereas the studs, as for instance 23' are mounted so as to come into contact with rod 22.

The result of these modifications is that the clutch 28 shall not go into operation for rotating the shaft 24 before the rod 22 shall have, among the studs 23, come into contact with that one which remains connected with the large studs 31 serving to produce the principal signals every 30° (for instance stud 23'). As soon as these principal signals have been produced, the toothed wheel 16 commences to rotate again, the rod 60 then gets into contact with the stud $23^2$; at that moment the current of battery 35 passes through the connection 51—50, the stud $23^2$, the rod 60, the sleeve 58 and the relay 36 returning then to battery 35. The relay 36 will then be closed and a signal ($e$) will be produced. The toothed wheel 16 continues its course and reaches the stud $23^3$ where a signal ($e$) is produced by the same mechanism. It will be the same every time the arm 60 comes into contact with one of the studs intended to produce a short signal. On the contrary if it be arm 22 which comes into contact with a stud, toothed wheel 16 will stop and toothed wheel 27 commences to rotate in order to produce the main signals. As soon as one of those signals has been sent out, the commutator 22 starts again and sends the signals "$e$" each time the arm 60 is in contact with one of the stops $23^2$ $23^3$, etc. The disposition of the stops is not changed but they might have a smaller width, if required.

It will be seen that rod 60 is electrically connected with shaft 24 by means of the conducting sleeve 58 and that such connection is necessary in order that the circuit of the relays 36 may be closed when rod 60 rests upon one of the studs 23², 23³ 23⁴ etc.

The studs 23', 23², the rod 60 and the rod 22 is such that the studs 23², etc., are engaged by the rod 60 while stud 23' is engaged by the rod 22.

The end of the switch lever 22 which makes contact on the keys, must be fairly narrow in order that, in passing on the keys 23² 23³ . . . which are to produce the small letters e, it should produce only a very short contact, just sufficient for producing a dot. It is therefore advisable to make the main keys 31' intended to operate the switch 30, a little wider in order that the clutch should have time to act distinctly, and that the switch 30 should turn to a sufficient angle and come on the next stud 31.

It goes without saying that these devices are merely given by way of example and their various details could be modified without departing from the principle. The clutches could be mechanical ones, and brake could be applied if necessary, either mechanically or electrically, in order to stop the arms 22—31 in the desired position after each of their movements. The spindle 7 could operate any desired rotating part different from the coil 4 of the radiogoniometer, by means of which directed waves could be obtained. For instance it could operate a rotating switch successively closing the circuit of fixed frames open at their lower portion and arranged in advance in each of the azimuths where signals are to be sent out. The circuits are arranged in accordance with Fig. 2, or in a similar manner, so that the rotating switch should open and close the contacts communicating with the fixed frames only when the circuit of the exciter 39 of the alternator 13 is shunted or open. In that way, high pressure sparks are avoided.

In order to simplify the apparatus, an ordinary mast wire could be for instance used for sending out, by means of non-directed waves, the signals indicating the chief azimuths every 30° and the signals giving the characteristic of the transmitting station. The directed waves would be used only for sending out every 3° a signal e for instance, so that the observer could recognize and determine the limits of his sector of reception.

The ordinary mast wire can moreover have the advantage of giving always the same intensity to the main signals, whatever be the direction of the frame at the moment. It is very easy to obtain the result hereinbefore referred to, in the case of Fig. 5, where the switch 30 is merely used for producing the main signals as it is then possible to utilize the current sent by the switch 22 into the coil 33 of the relay 29, for operating a second coil 40 which controls a relay and sends into a fixed mast wire the signals sent out by the switch 22.

This arrangement is shown in Fig. 6. When the circuit of the battery 34 is closed at 29, the coil 40 closes at 49 the circuit of the battery 48. The electromagnet 47 is excited, and its armature 45 is raised, the spring 44 being cocked, and the two arms 52 and 53 of a bipolar switch driven. These two arms leave the studs 55 and 56 (which opens the circuit 10, 11, 12) and come on the studs 57 and 58, thus closing a circuit which excites, by conduction or by induction, or in any other manner, an ordinary mast wire 43.

Having fully described my invention, what I claim and desire to secure by Letters Patent is:—

1. In an apparatus for indicating the position of a Hertzian lighthouse, the combination of a revolving device for sending out directed signal waves in different directions; a means for rotating said device an increment at a time; and automatic means for causing said device to send, between successive increments of movement, signals indicating the position of rotation of said device at the instant of each signal.

2. In an apparatus for indicating the position of a Hertzian lighthouse, the combination of a revolving device for sending out directed signal waves in different directions; a means for rotating said device an increment at a time; and automatic means for causing said device to send, between successive increments of movement, signals indicating the position of rotation of said device at the instant of each signal, said automatic means comprising a rotating commutator.

3. In an apparatus for indicating the position of a Hertzian lighthouse, the combination of a revolving device for sending out directed signal waves in different directions; a means for rotating said device an increment at a time; and means associated with said revolving device for automatically causing the device to emit short signals between successive increments of movement; and a continuously revolving motor for revolving said means at a constant speed.

4. In a method of indicating the direction of a Hertzian lighthouse, the stop consisting in sending out directed signal waves; varying the direction of said waves by successive increments; and emitting in a fixed direction, between successive increments of variation, signals indicating direction.

5. In a method of indicating the direction of a Hertzian lighthouse, the step consisting in sending out directed signal waves; automatically varying the direction of said waves by successive increments of movement; and automatically emitting, in a constant direction, between successive increments of movement, signals indicating direction.

In testimony whereof, I have signed my name to this specification in the presence of two subscribing witnesses.

ANDRÉ BLONDEL.

Witnesses:
 HENRI BOUZAL,
 HANSON C. COXE.